(12) United States Patent
Chen

(10) Patent No.: US 8,094,135 B2
(45) Date of Patent: Jan. 10, 2012

(54) TOUCH SCREEN MEASUREMENT CIRCUIT AND METHOD

(75) Inventor: Hung-I Chen, Kaohsiung (TW)

(73) Assignee: Mediatek Inc., Hsin-Chu (TW)

( * ) Notice: Subject to any disclaimer, the term of this patent is extended or adjusted under 35 U.S.C. 154(b) by 929 days.

(21) Appl. No.: 11/556,327

(22) Filed: Nov. 3, 2006

(65) Prior Publication Data
US 2007/0139390 A1 Jun. 21, 2007

Related U.S. Application Data

(60) Provisional application No. 60/751,729, filed on Dec. 19, 2005.

(51) Int. Cl.
*G06F 3/045* (2006.01)
(52) U.S. Cl. .................. 345/174; 345/156; 345/173
(58) Field of Classification Search .............. 345/156, 345/173, 174, 177; 178/18.01, 18.03, 18.05
See application file for complete search history.

(56) References Cited

U.S. PATENT DOCUMENTS

| | | | | |
|---|---|---|---|---|
| 5,327,163 A | * | 7/1994 | Hashimoto et al. | 345/173 |
| 5,581,254 A | * | 12/1996 | Rundel | 341/155 |
| 5,717,321 A | | 2/1998 | Kerth et al. | |
| 5,909,382 A | * | 6/1999 | Neoh | 708/141 |
| 5,914,681 A | * | 6/1999 | Rundel | 341/135 |
| 6,016,140 A | | 1/2000 | Blouin et al. | |
| 6,208,332 B1 | | 3/2001 | Ikegami | |
| 6,246,394 B1 | | 6/2001 | Kalthoff et al. | |
| 6,278,068 B1 | * | 8/2001 | Kuroodi | 178/18.05 |

FOREIGN PATENT DOCUMENTS

TW 200411567 7/2004

OTHER PUBLICATIONS

English abstract of TW200411567, pub. Jul. 1, 2004.

* cited by examiner

*Primary Examiner* — My-Chau T Tran
(74) *Attorney, Agent, or Firm* — Thomas|Kayden

(57) ABSTRACT

A touch screen digitizing system comprising a touch screen unit and an analog to digital converter. The touch screen unit includes a first resistive sheet with opposing first and second terminals and a second resistive sheet with opposing third and fourth terminals. The first and second resistive sheets are alternatively energized through the first, second, third, and fourth terminals. The analog to digital converter has an input coupled to the third terminal when the first resistive sheet is energized and the second resistive sheet is not, and coupled to the first terminal when the second resistive sheet is energized and the first resistive sheet is not, a first reference terminal dynamically coupled to a first reference voltage, a second reference terminal dynamically coupled to the second reference voltage, and an output terminal providing digital output data.

17 Claims, 5 Drawing Sheets

TOUCH SCREEN MEASUREMENT CIRCUIT AND METHOD

This application claims the benefit of U.S. Provisional Application No. 60/751,729, filed on Dec. 19, 2005.

BACKGROUND OF THE INVENTION

1. Field of the Invention

The invention relates to a touch screen and, in particular, to a touch screen digitizing system.

2. Description of the Related Art

Touchscreens, touch screens, touch panels or touchscreen panels are display overlays which are typically either pressure-sensitive (resistive), electrically-sensitive (capacitive), acoustically-sensitive (SAW—surface acoustic wave) or photo-sensitive (infra-red). The effect of such overlays allows a display to be used as an input device, removing the keyboard and/or the mouse as the primary input device for interacting with the display's content. Such displays can be attached to computers or, as terminals, to networks multiplexer A resistive touch screen panel is coated with a thin metallic electrically conductive and resistive layer that causes a change in the electrical current which is registered as a touch event and sent to the controller for processing. Resistive touch screen panels are generally more affordable but offer only 75% clarity and the layer can be damaged by sharp objects. Resistive touch screen panels are not affected by outside elements such as dust or water and are the most commonly used today.

BRIEF SUMMARY OF THE INVENTION

An embodiment of a touch screen digitizing system comprises a touch screen unit, an analog to digital converter, and first, second, third, and fourth switches. The touch screen unit includes a first resistive sheet with opposing first and second terminals and a second resistive sheet with opposing third and fourth terminals. The first switch is coupled between a first reference voltage and the first terminal, and a second switch is coupled between the second terminal and the second reference voltage such that the first resistive sheet can be energized. The third switch is coupled between a first reference voltage and the third terminal, and a fourth switch is coupled between the fourth terminal and the second reference voltage such that the second resistive sheet can be energized. The analog to digital converter has a first input, a first reference terminal, a second reference terminal, and an output terminal. The first input is coupled to the third terminal when the first resistive sheet is energized and the second resistive sheet is not, and coupled to the first terminal when the second resistive sheet is energized and the first resistive sheet is not. The first reference terminal is coupled to the first reference voltage during a sampling phase of the analog to digital converter and floats during a conversion phase of the analog to digital converter. The second reference terminal is coupled to the second reference voltage during the sampling phase and floats during the conversion phase. The output terminal provides digital output data The invention provides a touch screen digitizing system comprising an analog to digital converter (ADC) with reference terminals dynamically coupled to reference voltages. The reference terminals of the ADC are coupled to the reference voltages when the ADC is in a sampling phase and float during a conversion phase. As a result, power dissipation of the touch screen digitizing system is reduced. In addition, the touch screen digitizing system is immune to noise from operation of an LCD.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
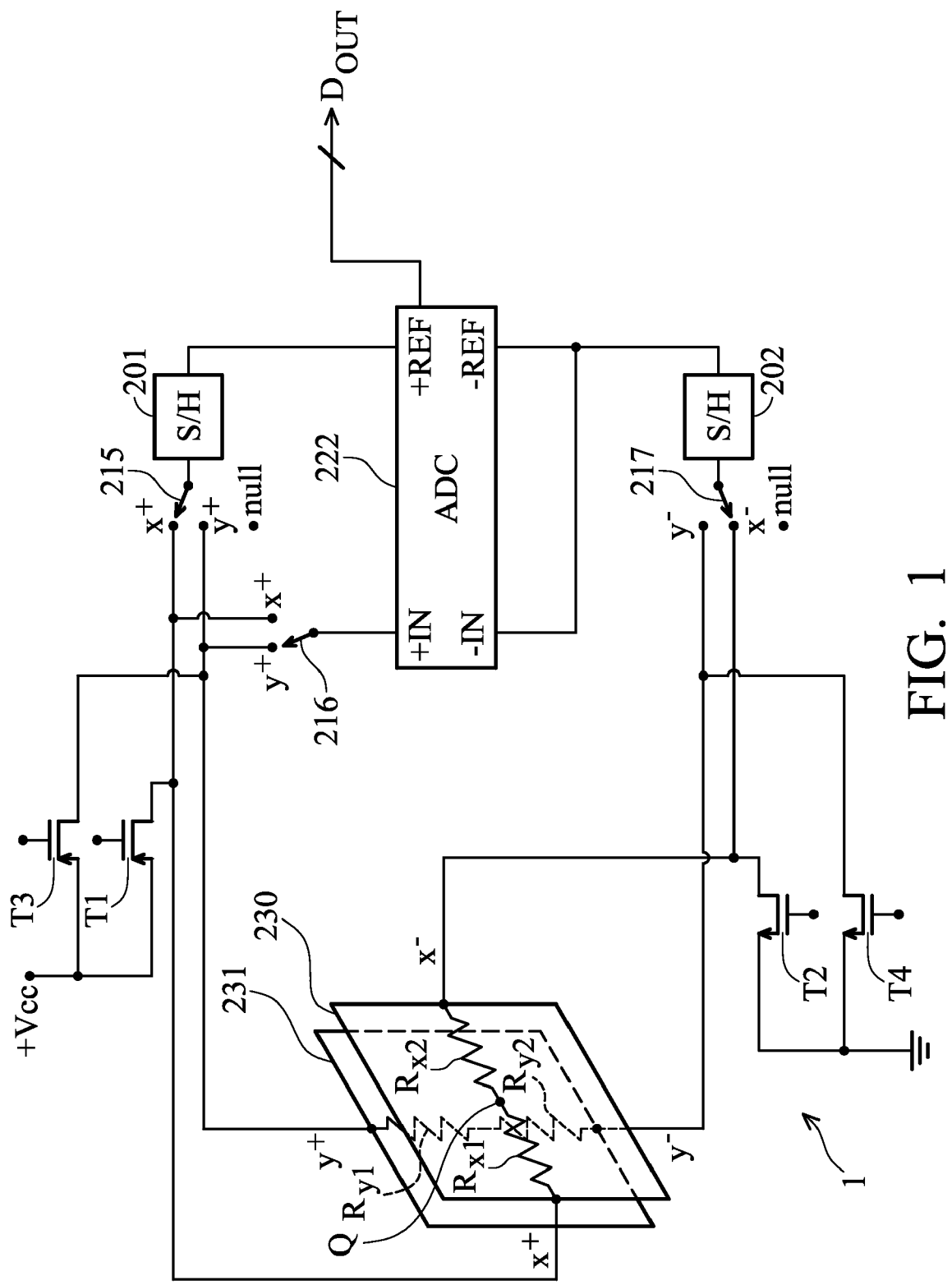
FIG. 1 is a schematic diagram of a touch screen digitizing system according to an embodiment of the invention.

FIG. 1 is a schematic diagram of a touch screen digitizing system according to an embodiment of the invention. The touch screen digitizing system comprises a touch screen unit, an analog to digital converter 222, and four MOS transistors T1~T4. The touch screen unit 1 comprises a first resistive sheet 230 and a second resistive sheet 231 parallel thereto. The first resistive sheet 230 has an x+ terminal and an x− terminal and the second resistive sheet 231 a y+ terminal and a y− terminal. A first MOS transistor T1 is coupled between the x+ terminal and a reference voltage Vcc and a second MOS transistor T2 between the x− terminal and a reference voltage GND. When the MOS transistors T1 and T2 are turned on, the first resistive sheet 230 is energized. A third MOS transistor T3 is coupled between the y+ terminal and a reference voltage Vcc and a fourth MOS transistor T4 between the y− terminal and a reference voltage GND. When the MOS transistors T3 and T4 are turned on, the second resistive sheet 231 is energized. In this embodiment, an x-axis of the first resistive sheet 230 is orthogonal to a y− axis of the second resistive sheet 231. Two resistances Rx1 and Rx2 are shown to represent the portions of the resistance of the first resistive sheet 230 on the left side and right side, respectively, of any contact point Q at which the pressure of a stylus or the like causes the first resistive sheet 230 to contact the second resistive sheet 231. Similarly, Ry1 and Ry2 represent the portions of the resistance of the second resistive sheet 231 above and below the contact point Q, respectively.

Referring to FIG. 1, the ADC 222 has a positive reference terminal +REF and a negative reference terminal −REF. The reference terminals of the ADC 222 determine a range, and hence a full scale digital value, of a digital output Dout. The positive reference terminal +REF is dynamically coupled to the x+ terminal of the first resistive sheet 230 or the y+ terminal of the second resistive sheet 231 via a first multiplexer 215. The negative reference terminal −REF is dynamically coupled to the x− terminal of the first resistive sheet 230 or the y− terminal of the second resistive sheet 231 via a second multiplexer 217. A negative input −IN of the ADC 222 is connected to the negative reference terminal −REF thereof. A positive input +IN of the ADC 222 is coupled to the x+ terminal of the first resistive sheet 230 or the y+ terminal of the second resistive sheet 231 via a third multiplexer 216. In addition, the touch screen digitizing system further comprises a first sample and hold circuit 201 coupled between the positive reference terminal +REF and the first multiplexer 215 and a second sample and hold circuit 202 coupled between the negative reference terminal −REF and the second multiplexer 217.

When the ADC 222 is at a sample phase and the x− coordinate of the contact point Q is to be extracted, the MOS transistors T1 and T2 are turned on and the first resistive sheet 230 energized. The reference voltages Vcc and GND are coupled to the x+ and x− terminals, at which time, the first multiplexer 215 and the second multiplexer 217 are also respectively coupled to x+ and x− terminals. Thus, the first sample and hold circuit 201 samples a voltage close to the reference voltage Vcc at the x+ terminal and the second sample and hold circuit 202 samples the reference voltage a voltage close to GND at the x− terminal. Alternately, when the ADC 222 is at a sample phase and the y− coordinate of the contact point Q is to be extracted, the MOS transistors T3 and T4 are turned on and the second resistive sheet 231 is energized. The reference voltages Vcc and GND are coupled to the y+ and y− terminals. At the moment, the first multiplexer 215 and the second multiplexer 217 are also respectively coupled to y+ and y− terminals. Thus, the first sample and hold circuit 201 samples a voltage close to the reference voltage Vcc at the y+ terminal and the second sample and hold circuit 202 samples a voltage close to the reference voltage GND at the y− terminal.

The ADC starts a conversion phase thereof after the sampling phase is over. During the conversion phase, the sampled voltages are still retained by the first and second sample and hold circuits 201 and 202, and the positive and negative reference terminals +REF and −REF of the ADC 222 still receive stable voltages for use in conversion. In the conversion phase, the first and second multiplexers float and the MOS transistors T1~T4 are turned off. Thus, there is no quiescent current through the first and second resistive sheets 230 and 231 when the ADC 222 is in a conversion phase. The first and second sample and hold circuits 201 and 202 are provided with good power supply rejection ratio (PSRR) via careful design. Since the reference voltages required by the ADC 222 for the conversion phase are supplied by the first and second sample and hold circuits 201 and 202, operation of the ADC 222 is immune to noise from operation of a LCD.

Figure 2A:
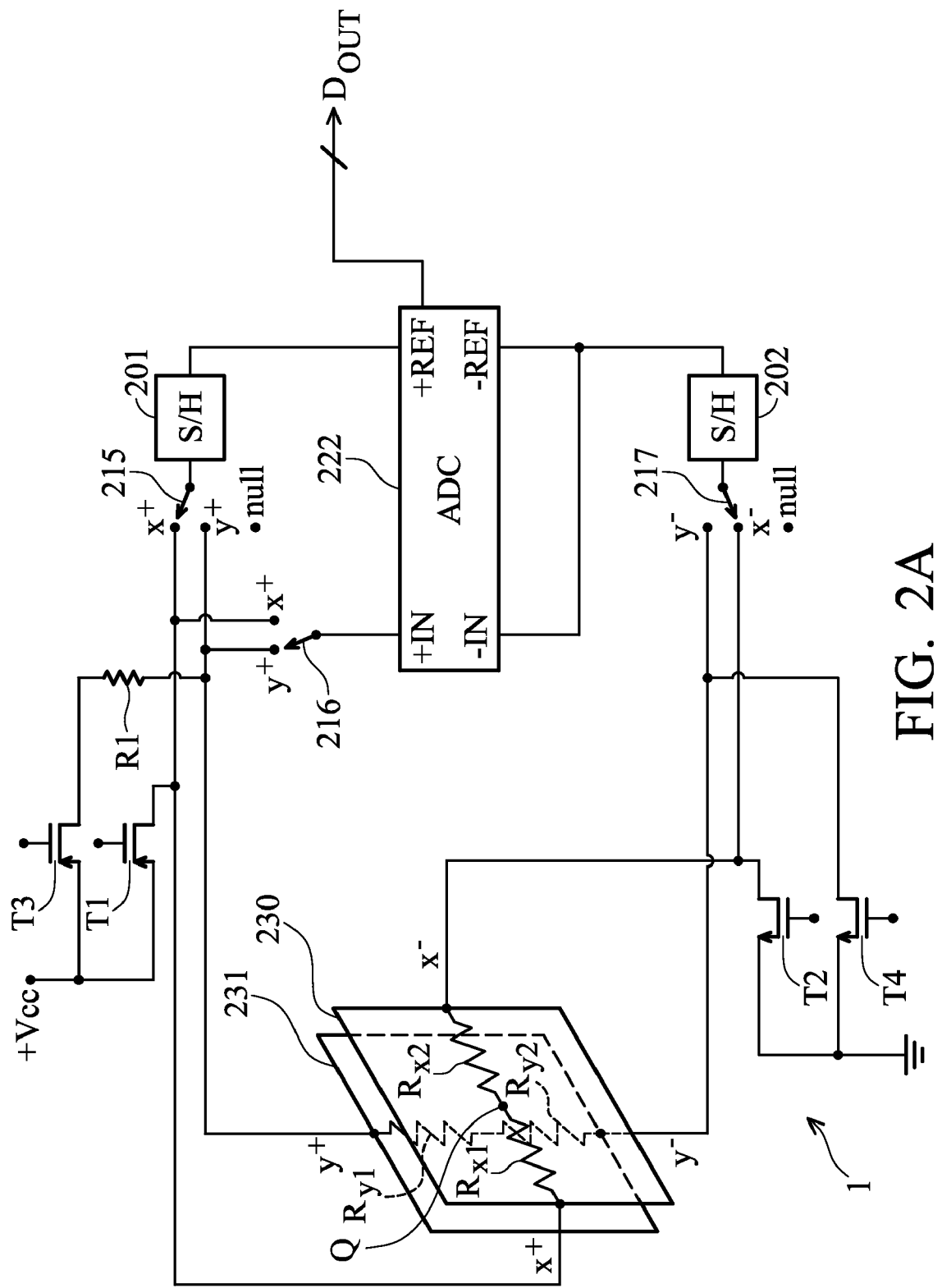
FIGS. 2A to 2D are schematic diagrams of a touch screen digitizing system according to another embodiment of the invention.
Figure 2B:
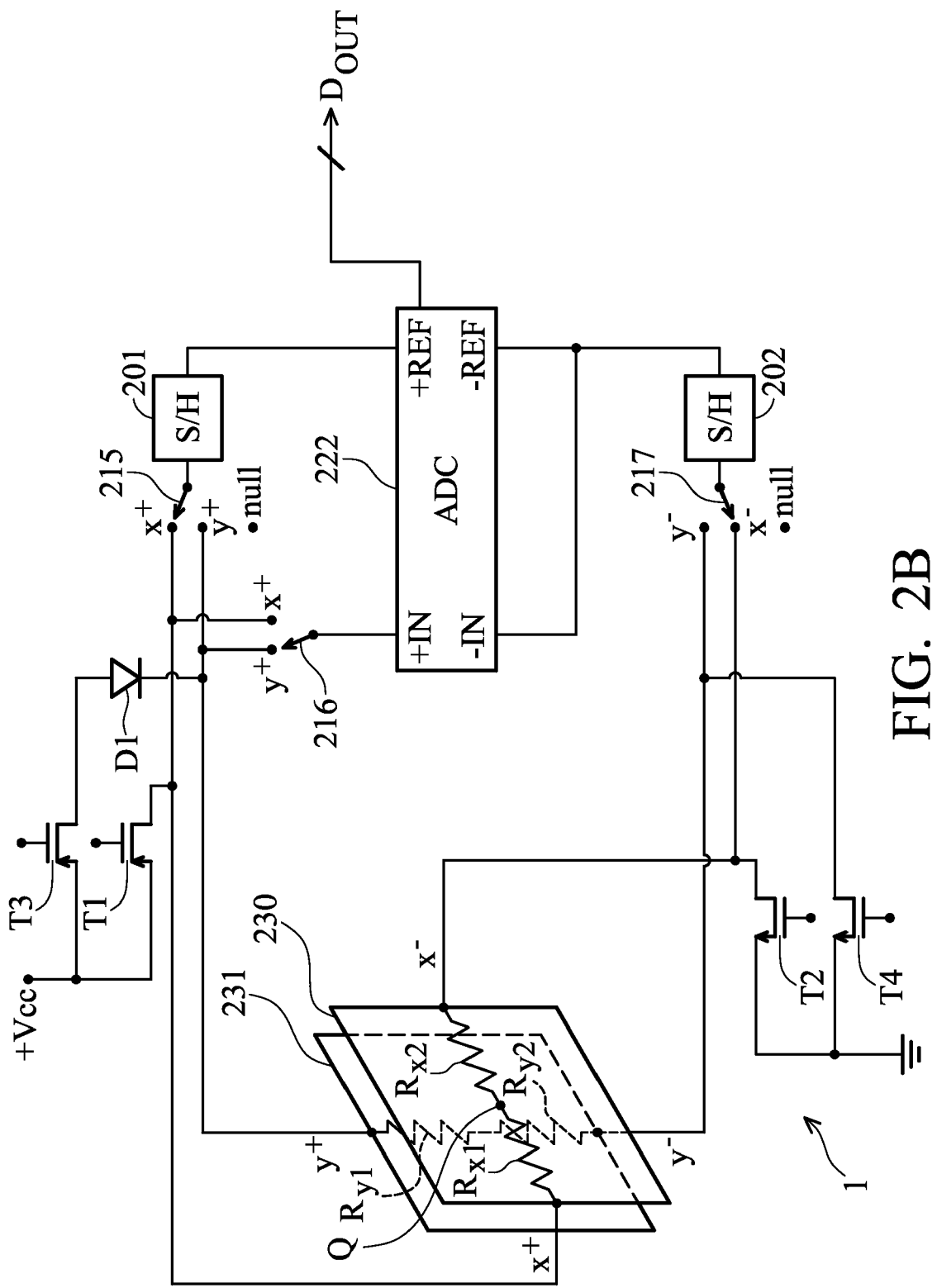

FIGS. 2A and 2B are schematic diagrams of a touch screen digitizing system according to another embodiment of the invention. FIGS. 2A and 2B are similar to FIG. 1 and only differ in that a diode D1 or a resistor R1 is inserted between the third MOS transistor T3 and the y+ terminal. The diode D1 or the resistor is used as a voltage drop generator for providing a voltage drop across the diode D1 or the resistor. Due to the voltage drop across the diode D1 or the resistor R1, voltage difference between the y+ and y− terminals is reduced and current flowing through the resistive sheet 231 is thus limited. As a result, the voltage difference between the y+ and y− terminals is lower than that between the x+ and x− terminals. Since length in one dimension of the resistive sheet 231 is shorter than the other side, i.e. $R_{y1}+R_{y2}<R_{x1}+R_{x2}$, the SNR requirement of the shorter side is not as high as the requirement of the longer side. Therefore, fewer bits and lower voltage difference between the y+ and y− terminals are sufficient to represent the position of Q. For example, if 8 bits are used to represent a position in the x− dimension, 7 bits may be sufficient to represent a position in the y− dimension. In another embodiment, the resistor R1 or the diode D1 can be placed between the MOS transistor T4 and the sample and hold circuit 202.

Figure 2C:
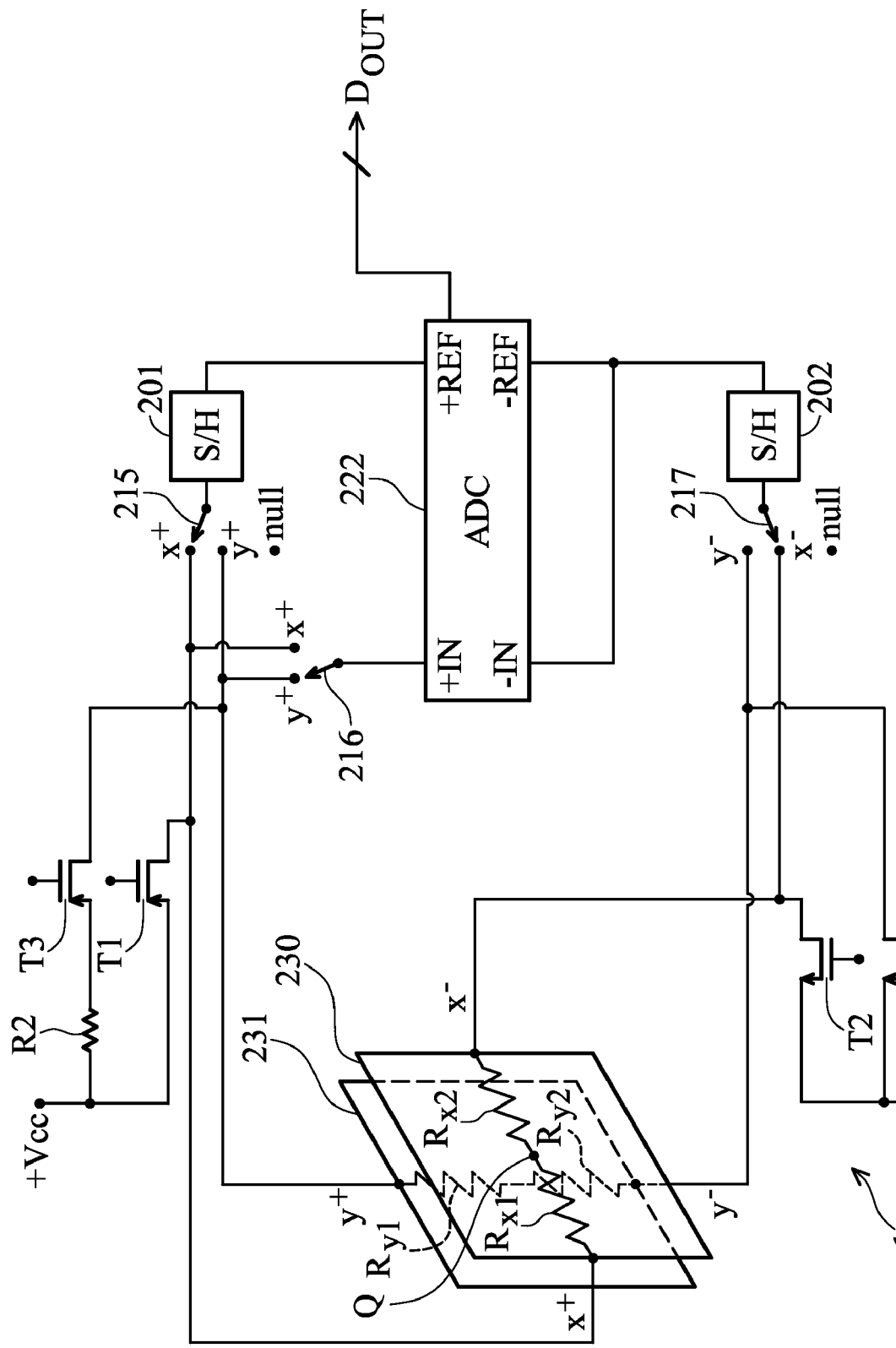
Figure 2D:
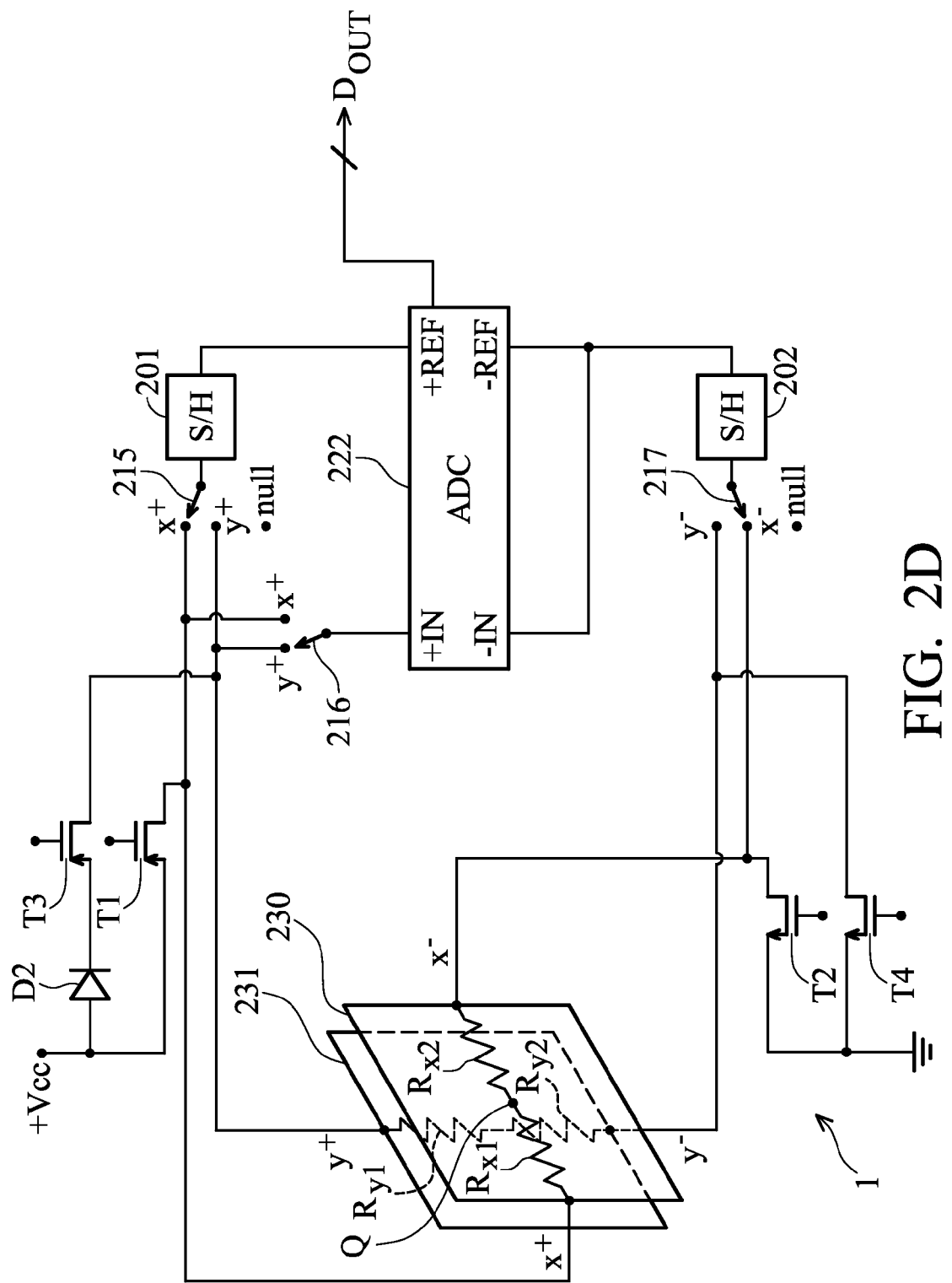

FIGS. 2C and 2D are schematic diagrams of a touch screen digitizing system according to another embodiment of the invention. FIGS. 2C and 2D are similar to FIG. 1 and only differ in that a diode D2 or a resistor R2 is inserted between the third MOS transistor T3 and the reference voltage Vcc. Insertion of the diode D2 or the resistor R2 has the same effect as that of the diode D1 or the resistor R1 in FIGS. 2A and 2B and detailed description is thus skipped. In another embodiment, the resistor R2 or the diode D2 can be placed between the MOS transistor T4 and the reference voltage GND.

The invention provides a touch screen digitizing system comprising an analog to digital converter (ADC) with reference terminals dynamically coupled to reference voltages. The reference terminals of the ADC are coupled to the reference voltages when the ADC is in a sampling phase and float during a conversion phase. As a result, power dissipation of the touch screen digitizing system is reduced. In addition, the touch screen digitizing system is immune to noise from operation of an LCD.

While the invention has been described by way of example and in terms of preferred embodiment, it is to be understood that the invention is not limited thereto. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A touch screen digitizing system, comprising:
   a touch screen unit including a first resistive sheet with opposing first and second terminals and a second resistive sheet with opposing third and fourth terminals;
   a first switch coupled between a first reference voltage and the first terminal, and a second switch coupled between the second terminal and a second reference voltage for energizing the first resistive sheet;
   an analog to digital converter comprising:
   a first input coupled to the third terminal when the first resistive sheet is energized and the second resistive sheet is not energized, the first resistive sheet capable of touching the second resistive sheet at a contact point;
   a first reference terminal coupled to the first reference voltage during a sampling phase of the analog to digital converter and being floating and held at a first voltage level thereon during a conversion phase of the analog to digital converter;
   a second reference terminal coupled to the second reference voltage during the sampling phase and being floating and held at a second voltage level thereon during the conversion phase; and
   an output terminal providing digital output data; and
   a third switch coupled between the first reference voltage and the third terminal, and a fourth switch coupled between the fourth terminal and the second reference voltage for energizing the second resistive sheet; and
   a voltage drop generator coupled between the third switch and the third terminal, wherein the voltage drop generator is a diode, and wherein:
   the first input of the analog to digital converter is coupled to the first terminal when the second resistive sheet is energized and the first resistive sheet is not.

2. The touch screen digitizing system as claimed in claim 1, wherein the first reference terminal is dynamically coupled to the first reference voltage via a first multiplexer and a first sample and hold circuit coupled between the first multiplexer and the analog to digital converter.

3. The touch screen digitizing system as claimed in claim 1, wherein the second reference terminal is dynamically coupled to the second reference voltage via a second multiplexer and a second sample and hold circuit coupled between the second multiplexer and the analog to digital converter.

4. The touch screen digitizing system as claimed in claim 1, wherein the first and second switches are MOS transistors.

5. The touch screen digitizing system as claimed in claim 1, wherein the first input of the analog to digital converter is coupled to the first or third terminal via a third multiplexer.

6. The touch screen digitizing system as claimed in claim 1, wherein the first, second, third, and fourth switches are MOS transistors.

7. A touch screen digitizing system comprising:
a touch screen unit including a first resistive sheet with opposing first and second terminals and a second resistive sheet with opposing third and fourth terminals;
a first switch coupled between a first reference voltage and the first terminal, and
a second switch coupled between the second terminal and a second reference voltage for energizing the first resistive sheet;
an analog to digital converter comprising:
a first input coupled to the third terminal when the first resistive sheet is energized and the second resistive sheet is not energized, the first resistive sheet capable of touching the second resistive sheet at a contact point;
a first reference terminal coupled to the first reference voltage during a sampling phase of the analog to digital converter and being floating and held at a first voltage level thereon during a conversion phase of the analog to digital converter;
a second reference terminal coupled to the second reference voltage during the sampling phase and being floating and held at a second voltage level thereon during the conversion phase;
an output terminal providing digital output data;
a third switching means coupled between the first reference voltage and the third terminal, and
a fourth switch coupled between the fourth terminal and the second reference voltage for energizing the second resistive sheet; and
a voltage drop generator coupled between the third switching means and the first reference voltage, wherein the voltage drop generator is a resistor, and wherein:
the first input of the analog to digital converter is coupled to the first terminal when the second resistive sheet is energized and the first resistive sheet is not.

8. The touch screen digitizing system as claimed in claim 7, wherein the first reference terminal is dynamically coupled to the first reference voltage via a first multiplexer and a first sample and hold circuit coupled between the first multiplexer and the analog to digital converter.

9. The touch screen digitizing system as claimed in claim 7, wherein the second reference terminal is dynamically coupled to the second reference voltage via a second multiplexer and a second sample and hold circuit coupled between the second multiplexer and the analog to digital converter.

10. The touch screen digitizing system as claimed in claim 7, wherein the first input of the analog to digital converter is coupled to the first or third terminal via a third multiplexer.

11. The touch screen digitizing system as claimed in claim 7, wherein the first, second, third, and fourth switches are MOS transistors.

12. A touch screen digitizing system comprising:
a touch screen unit including a first resistive sheet with opposing first and second terminals and a second resistive sheet with opposing third and fourth terminals;
a first switch coupled between a first reference voltage and the first terminal, and a second switch coupled between the second terminal and a second reference voltage for energizing the first resistive sheet;
an analog to digital converter comprising:
a first input coupled to the third terminal when the first resistive sheet is energized and the second resistive sheet is not energized, the first resistive sheet capable of touching the second resistive sheet at a contact point;
a first reference terminal coupled to the first reference voltage during a sampling phase of the analog to digital converter and being floating and held at a first voltage level thereon during a conversion phase of the analog to digital converter;
a second reference terminal coupled to the second reference voltage during the sampling phase and being floating and held at a second voltage level thereon during the conversion phase; and
an output terminal providing digital output data;
a third switching means coupled between the first reference voltage and the third terminal, and a fourth switch coupled between the fourth terminal and the second reference voltage for energizing the second resistive sheet, wherein the first input of the analog to digital converter is coupled to the first terminal when the second resistive sheet is energized and the first resistive sheet is not; and
a voltage drop generator coupled between the third switching means and the first reference voltage, wherein the voltage drop generator is a diode.

13. The touch screen digitizing system as claimed in claim 12, wherein the first reference terminal is dynamically coupled to the first reference voltage via a first multiplexer and a first sample and hold circuit coupled between the first multiplexer and the analog to digital converter.

14. The touch screen digitizing system as claimed in claim 12, wherein the second reference terminal is dynamically coupled to the second reference voltage via a second multiplexer and a second sample and hold circuit coupled between the second multiplexer and the analog to digital converter.

15. The touch screen digitizing system as claimed in claim 12, wherein the first input of the analog to digital converter is coupled to the first or third terminal via a third multiplexer.

16. The touch screen digitizing system as claimed in claim 12, wherein the first, second, third, and fourth switches are MOS transistors.

17. A touch screen digitizing system, comprising:
a touch screen unit including a first resistive sheet with opposing first and second terminals and a second resistive sheet with opposing third and fourth terminals;
a first switch coupled between a first reference voltage and the first terminal, and a second switch coupled between the second terminal and a second reference voltage for energizing the first resistive sheet;
an analog to digital converter comprising:
a first input coupled to the third terminal when the first resistive sheet is energized and the second resistive sheet is not energized, the first resistive sheet capable of touching the second resistive sheet at a contact point;
a first reference means coupled to the first reference voltage during a sampling phase of the analog to digital converter and being floating and held at a first voltage level thereon during a conversion phase of the analog to digital converter; and a second reference means coupled to the second reference voltage during the sampling phase and being floating and held at a second voltage level thereon during the conversion phase; and an output terminal providing digital output data;

a third switch coupled between the first reference voltage and the third terminal, wherein the first input of the analog to digital converter is coupled to the first terminal when the second resistive sheet is energized and the first resistive sheet is not; and a voltage drop generator coupled between the third switch and the third terminal, wherein the voltage drop generator is a diode.

* * * * *